United States Patent
Jurzak et al.

(10) Patent No.: US 10,356,722 B2
(45) Date of Patent: Jul. 16, 2019

(54) METHOD AND APPARATUS FOR BASE STATION TRANSMIT POWER ADJUSTMENT TO REDUCE POWER CONSUMPTION

(71) Applicant: MOTOROLA SOLUTIONS, INC, Schaumburg, IL (US)

(72) Inventors: Pawel Jurzak, Crakow (PL); Nathanael P Kuehner, Rolling Meadows, IL (US); Robert Mrowiec, Liszki (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 290 days.

(21) Appl. No.: 14/838,580

(22) Filed: Aug. 28, 2015

(65) Prior Publication Data

US 2016/0095067 A1 Mar. 31, 2016

(30) Foreign Application Priority Data

Sep. 25, 2014 (EP) .................... 14460058

(51) Int. Cl.
*H04W 52/04* (2009.01)
*H04W 52/02* (2009.01)
(Continued)

(52) U.S. Cl.
CPC .............. *H04W 52/04* (2013.01); *H04B 3/46* (2013.01); *H04B 17/24* (2015.01);
(Continued)

(58) Field of Classification Search
CPC combination set(s) only.
See application file for complete search history.

(56) References Cited

U.S. PATENT DOCUMENTS 5,881,368 A 3/1999 Grob
6,070,058 A 5/2000 Waldroup
(Continued)

FOREIGN PATENT DOCUMENTS

EP 1081876 A2 3/2001
EP 1374440 B1 5/2011
(Continued)

OTHER PUBLICATIONS

Extended European Search Report for corresponding European Patent Application No. EP14460058.2, dated Aug. 21, 2015.
(Continued)

*Primary Examiner* — Yemane Mesfin
*Assistant Examiner* — Mon Cheri S Davenport
(74) *Attorney, Agent, or Firm* — Daniel R. Bestor (57) ABSTRACT

A process for adjusting base station transmit power to reduce power consumption in a wireless radio system, the method includes causing, by a radio controller, a message to be transmitted on a control channel in the wireless radio system proposing a transmit power reduction with respect to a traffic channel in the wireless radio system. Subsequently monitoring, by the radio controller, one or both of the control channel and the traffic channel for an indication from a mobile station affected by the proposed power reduction that the proposed power reduction is unacceptable. And modifying, by the radio controller, as a function of the presence or absence of the indication, the transmit power of the traffic channel.

16 Claims, 5 Drawing Sheets

(51) Int. Cl.
*H04B 17/24* (2015.01)
*H04B 3/46* (2015.01)
*H04W 74/00* (2009.01)
*H04W 52/16* (2009.01)
*H04W 52/36* (2009.01)
*H04W 88/08* (2009.01)
*H04W 88/12* (2009.01)

(52) U.S. Cl.
CPC ....... *H04W 52/0206* (2013.01); *H04W 52/16* (2013.01); *H04W 52/367* (2013.01); *H04W 74/002* (2013.01); *H04W 88/08* (2013.01); *H04W 88/12* (2013.01); *Y02D 70/00* (2018.01); *Y02D 70/1262* (2018.01); *Y02D 70/142* (2018.01); *Y02D 70/144* (2018.01); *Y02D 70/146* (2018.01); *Y02D 70/23* (2018.01)

(56) References Cited

U.S. PATENT DOCUMENTS

| | | | |
|---|---|---|---|
| 6,236,863 B1 | 5/2001 | Waldroup | |
| 6,411,817 B1* | 6/2002 | Cheng | H04W 52/20 370/318 |
| 6,728,550 B1 | 4/2004 | Bohnke | |
| 6,944,177 B2 | 9/2005 | Panchal et al. | |
| 7,082,107 B1 | 7/2006 | Arvelo | |
| 7,103,319 B2 | 9/2006 | Cai | |
| 7,561,894 B2 | 7/2009 | Nishio | |
| 7,570,916 B2 | 8/2009 | Xiao | |
| 7,587,219 B2 | 9/2009 | Bottomley | |
| 7,593,746 B2 | 9/2009 | Willenegger | |
| 7,734,309 B2 | 6/2010 | Chi | |
| 7,853,220 B2 | 12/2010 | Love | |
| 7,860,462 B2 | 12/2010 | Sarkkinen | |
| 8,442,144 B2 | 5/2013 | Ylitalo | |
| 8,687,607 B2 | 4/2014 | Casaccia | |
| 8,730,989 B2 | 5/2014 | Pelletier | |
| 8,774,816 B2 | 7/2014 | Chen | |
| 2004/0218567 A1* | 11/2004 | Budka | H04L 1/0003 370/332 |
| 2006/0252450 A1* | 11/2006 | Wigard | H04W 52/146 455/522 |
| 2010/0279686 A1 | 11/2010 | Tokgoz et al. | |
| 2011/0116480 A1 | 5/2011 | Cho et al. | |
| 2014/0050205 A1* | 2/2014 | Ahn | H04W 52/146 370/336 |
| 2015/0018032 A1* | 1/2015 | Cai | H04W 52/143 455/522 |

FOREIGN PATENT DOCUMENTS

| | | |
|---|---|---|
| EP | 1 698 163 B1 | 7/2012 |
| EP | 2579655 B1 | 3/2014 |
| WO | 2008054673 A1 | 5/2008 |

OTHER PUBLICATIONS

European Search Report dated April 3, 2015 for Counterpart Application EP14460058.2.

\* cited by examiner

METHOD AND APPARATUS FOR BASE STATION TRANSMIT POWER ADJUSTMENT TO REDUCE POWER CONSUMPTION

This application is a US National Filing and is filed within one year of, and claims priority to under 35 U.S.C. § 119, European Patent Application No. EP 14460058.2, filed in the European Patent Office on Sep. 25, 2014, the entire contents of which are incorporated herein by reference.

BACKGROUND OF THE INVENTION

Radio access networks (RANs) provide for radio communication links to be arranged within the network between a plurality of user terminals. Such user terminals may be mobile and may be known as 'mobile stations' or 'mobile stations.' At least one other terminal, e.g. used in conjunction with mobile stations, may be a fixed terminal, e.g. a base station, eNodeB, repeater, and/or access point. Such a RAN typically includes a system infrastructure that generally includes a network of various fixed terminals, which are in direct radio communication with the mobile stations. Each of the fixed terminals operating in the RAN may have one or more transceivers which may, for example, serve mobile stations in a given region or area, known as a 'cell' or 'site', by radio frequency (RF) communication. The mobile stations that are in direct communication with a particular fixed terminal are said to be served by the fixed terminal In one example, all radio communications to and from each mobile station within the RAN are made via respective serving fixed terminals. Sites of neighboring fixed terminals may be offset from one another and may be non-overlapping or partially or fully overlapping with one another.

RANs may operate according to an industry standard broadband protocol such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Because these generally systems provide lower throughput than the 3GPP and LTE systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocols. Mobile stations in RANs such as those set forth above send and receive media data (encoded voice, audio, images, and/or video) and other types of data in accordance with the designated protocol.

OMA-PoC, in particular, enables familiar PTT and "instant on" features of traditional half duplex mobile stations, but uses mobile stations operating over modern cellular telecommunications networks. Using PoC, wireless mobile stations such as mobile telephones and notebook computers can function as PTT half-duplex mobile stations for transmitting and receiving auditory data. Other types of PTT models and multimedia call models (MMCMs) are also available.

Floor control in an OMA-PoC session is generally maintained by a PTT server that controls communications between two or more wireless mobile stations. When a user of one of the mobile stations keys a PTT button, a request for permission to speak in the OMA-PoC session is transmitted from the user's mobile station to the PTT server using, for example, a real-time transport protocol (RTP) message. If no other users are currently speaking in the PoC session, an acceptance message is transmitted back to the user's mobile station and the user can then speak into a microphone of the device. Using standard compression/decompression (codec) techniques, the media is digitized (if necessary) and transmitted using discrete data packets (e.g., together which form a stream over time), such as according to RTP and internet protocols (IP), to the PTT server. The PTT server then transmits the data packets to other users of the PoC session (e.g., to other mobile stations in the group of mobile stations or talkgroup to which the user is subscribed), using for example a unicast, point to multipoint, or broadcast communication technique.

Narrowband LMR systems, on the other hand, operate in either a conventional or trunked configuration. In either configuration, a plurality of mobile stations are partitioned into separate groups of mobile stations. In a conventional system, each mobile station in a group is selected to a particular frequency for communications associated with that mobile station's group. Thus, each group is served by one channel, and multiple groups may share the same single frequency (in which case, in some embodiments, group IDs may be present in the group data to distinguish between groups using the same shared frequency).

In contrast, a trunked radio system and its mobile stations use a pool of traffic channels for virtually an unlimited number of groups of mobile stations (e.g., talkgroups). Thus, all groups are served by all channels. The trunked radio system works to take advantage of the probability that not all groups need a traffic channel for communication at the same time. When a member of a group requests a call on a control channel (sometimes also identified as a rest channel) on which all of the mobile stations in the system idle awaiting new call notifications, in one embodiment, a call controller assigns a separate traffic channel for the requested group call, and all group members move from the assigned control channel to the assigned traffic channel for the group call. In another embodiment, when a member of a group requests a call on the control channel, the call controller may convert the control on which the mobile stations were idling to a traffic channel for the call, and instruct all mobile stations that are not participating in the new call to move to a newly assigned control channel selected from the pool of available channels. With a given number of channels, a much greater number of groups can be accommodated in a trunked system as compared with conventional radio systems.

Group calls may be made between wireless and/or wireline participants in accordance with either or both of a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile stations) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile stations may dynamically affiliate with a group (and also disassociate with the group) perhaps based on user input, and the switching and/or radio network may track group membership and route new group calls according to the current group membership.

One problem that has arisen with the increasing proliferation of wireless mobile stations and increasing number of separate groups of mobile stations in RANs is that a number of channels that can be supported at a single multicarrier base station remains limited by a power capacity of the power amplifier at the base station. As the number of carriers is increased, the power available to each channel decreases. Conversely, as the power used to transmit each channel is decreased, the number of carriers can be increased.

Further, the continued adoption of alternative energy, power-limited RANs that may contain one or more base stations powered by alternative energy sources such as solar or wind energy, places further limitations on power consumption in the RANs.

Accordingly, what is needed is an improved method and apparatus for adjusting base station transmit power in RANs so as to further reduce power consumption and/or increase the number of available carriers in the RANs.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method and apparatus for adjusting base station transmit power in a RAN so as to further reduce power consumption and/or increase the number of available carriers in the RAN.

In one embodiment, a process for adjusting base station transmit power to reduce power consumption in a wireless radio system includes: causing, by a radio controller, a message to be transmitted on a control channel in the wireless radio system proposing a transmit power reduction with respect to a traffic channel in the wireless radio system; monitoring, by the radio controller, one or both of the control channel and the traffic channel for an indication from a mobile station affected by the proposed power reduction that the proposed power reduction is unacceptable; and modifying, by the radio controller, as a function of the presence or absence of the indication, the transmit power of the traffic channel.

In another embodiment, a radio controller in a wireless radio system includes: a transceiver; a data store; and one or more processors configured to: cause a message to be transmitted on a control channel in the wireless radio system proposing a transmit power reduction with respect to a traffic channel in the wireless radio system; monitor one or both of the control channel and the traffic channel for an indication from a mobile station affected by the proposed power reduction that the proposed power reduction is unacceptable; and modify, as a function of the presence or absence of the indication, the transmit power of the traffic channel.

In a still further embodiment, a mobile station in a wireless radio system includes: a transceiver; a memory storing computer readable instructions; and one or more processors that, in response to executing the computer readable instructions, performs a set of functions comprising: receiving, via the transceiver and a control channel in the wireless radio system, a message proposing a transmit power reduction on a traffic channel in the wireless radio system on which the mobile station is receiving or expects to receive communication information; determining, as a function of a measured received signal strength indication (RSSI) of the control channel and a preconfigured or dynamically determined minimum receive signal strength, a link margin; comparing the determined link margin to the proposed transmit power reduction, and responsive to determining that the proposed transmit power reduction is greater than the link margin, transmitting, via the transceiver, a signal indicative of the unacceptable nature of the proposed transmit power reduction on one of the control channel and the traffic channel.

Each of the above-mentioned embodiments will be discussed in more detail below, starting with example network and device architectures of the system in which the embodiments may be practiced, followed by an illustration of processing steps and message transmissions and receptions executable at a radio controller and mobile station for adjusting base station transmit power to reduce power consumption. Further advantages and features consistent with this disclosure will be set forth in the following detailed description, with reference to the figures.

1. Network Architecture and Device Structure

Figure 1:
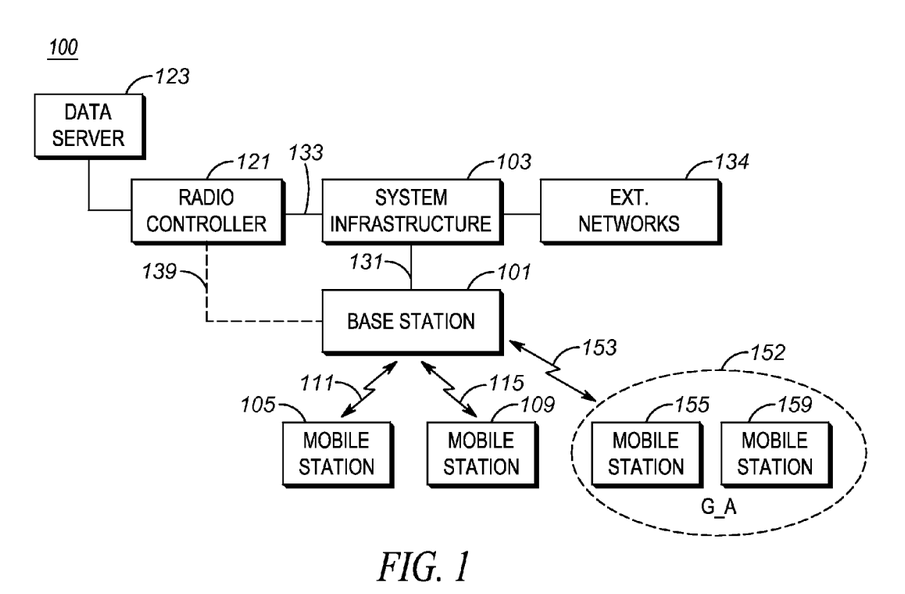
FIG. 1 is a block diagram of a wireless radio communication system in accordance with some embodiments.

FIG. 1 shows a wireless radio communication system 100 that may be adapted in accordance with an embodiment of the disclosure. It will be apparent to those skilled in the art that the system 100 and the components that are to be described as operating therein may take a number of forms well known to those skilled in the art. Thus, the layout of the system 100, and of its operational components to be described, should be regarded as illustrative rather than limiting.

The system 100 shown in FIG. 1 includes one or more base stations 101 operably connected to a system infrastructure 103 via respective wired or wireless link(s) 131. As used herein, the term "base station" (BS) refers to any entity that includes a transmitter and/or receiver to perform the functionality of receiving traffic information from a signal source (e.g. initiating/transmitting mobile station 105) and transmitting some or all of the traffic information to one or more signal destinations (e.g., mobile station 109, mobile station 155, mobile station 159, system infrastructure 103, dispatch console, etc.). For example, the BS 101 may comprise, among other possibilities, a cellular wireless base station, a two-way radio repeater, an IEEE 802-based wireless access points, an eNodeB, or other similar devices.

The BS 101 has radio links with a plurality of mobile stations (MSs), particularly MSs in a service cell or site at least partially defined by a geographic location of the BS 101. In addition, BS 101 may maintain a direct wireless or wired link 139 (or indirect link via system infrastructure 103) with a radio controller 121 or other radio network communications device (such as a zone controller). While the radio controller 121 is illustrated as a separate entity in the system 100, in other embodiments, the radio controller 121 may be integrated with other devices (such as a zone controller) in system infrastructure 103 and/or within BS 101. The radio controller 121 may further be configured to provide registration, authentication, encryption, routing, and/or other services to BS 101 so that MSs operating within its coverage area may communicate with other MSs or infrastructure devices in the system 100. The radio controller 121 may also track or have access to group subscription information that, for each group identifier associated with a particular group of radios (e.g., talkgroup), identifies MSs (e.g., by hardware ID, hardware MAC address, IP address, radio ID, International Mobile Subscriber Identity (IMSI), a serial number, or some other unique identifier that can be used to identify subscribed member MSs) that are members of the particular group of radios.

Four MSs 105, 109, 155, 159 are illustrated in FIG. 1 as being within the service area of, and being registered with, BS 101 via respective radio links 111, 115, 153. Each MS 105, 109, 155, 159 may be a group communications device, such as a push-to-talk (PTT) device, that is normally maintained in a monitor only mode, and which switches to a transmit-only mode (for half-duplex devices) or transmit and receive mode (for full-duplex devices) upon depression or activation of a PTT input switch. The group communications architecture in the system 100 allows a single MS, such as MS 155, to communicate with one or more members (such as MS 159) associated with a particular group of MSs (G_A 152) at the same time. While only two MSs are illustrated in G_A 152 in FIG. 1, in other examples, any number of MSs may be associated with or subscribed to G_A 152, and other MSs such as MSs 105 or 109 may dynamically associate with or subscribe to the group G_A 152 at any time.

The one-to-many group communication structure may be implemented in the system 100 in a number of ways and using any one or more messaging protocols, including multiple unicast transmissions (each addressed to a single group member MS), single multicast transmissions (addressed to a single group or multiple groups), single broadcast transmissions (the broadcast transmission perhaps including one or more group identifiers that can be decoded and matched by the receiving MSs), or any combination thereof.

The radio links 111, 115, 153 may operate according to a conventional or trunked FDMA or TDMA LMR protocol, an LTE protocol, or some other air-interface protocol. The radio links 111, 115, 153 may represent separate physical or logical channels (unicast) or a single physical or logical multicast or broadcast channel, or some various combination of the two, and each channel may comprise a channel set including an uplink channel portion and a downlink channel portion separated by time, frequency, or code. In the example illustrated in FIG. 1, radio links 111 and 115 may represent a single control channel on which MSs 105 and 109 are idling, and radio link 153 may represent a group multicast or broadcast channel assigned to the group of radios G_A 152 comprising MSs 155 and 159. Other examples are possible as well.

The BS 101 may thereby serve MSs including the MSs 105, 109, 155, 159 with radio communications to and from other terminals, including (i) MSs served by the BS 101, (ii) MSs served by other BSs (not shown), (iii) other terminals including MSs in other systems (not shown) operably linked to the system 100 via the system infrastructure 103, and (iv) a dispatch console (not shown).

While only one BS 101 is illustrated in FIG. 1, in other examples, the communication system 100 may include a plurality of BSs under control of the same radio controller 121 or a different radio controller, and coupled directly to system infrastructure 103 or coupled via an inter-system interface. Other variations are possible as well.

The system infrastructure 103 includes known sub-systems required for operation of the system 100. Such sub-systems may include, for example, sub-systems providing additional authentication, routing, registration, location, system management, encryption, and other operational functions within the system 100 that may supplement or replace functionality noted above as being provided by radio controller 121. For example, system infrastructure 103 may include one or more of a call controller, PTT server, zone controller, mobile management entity (MME), base station controller (BSC), mobile switching center (MSC), site controller, PTT controller, or other network device for controlling and distributing group communications amongst MSs and/or other infrastructure devices. The system infrastructure 103 may also provide routes to other BSs providing cells serving other MSs, and/or may provide access to other external types of networks such as the plain old telephone system (POTS) network or a data-switched network such as the Internet labeled as external networks 134 in FIG. 1. The system infrastructure 103 may also maintain a separate link 133 to the radio controller 121.

Data server 123 may be a storage device and/or application server that stores and/or otherwise processes data provided by MSs or other infrastructure devices, such as MS device profiles, MS IDs, MS IP addresses, which MSs are authorized for service in system 100, what services such MSs are authorized to access, authentication information for use in authenticating MSs, MS current or historical location data, or current MS group membership data. Data stored at the data server 123 may be made available (before or after further processing executed at the data server 123) at a display directly coupled to the data server 123, at MSs in the system 100, or at a dispatch console otherwise coupled to the system infrastructure 103, among other possibilities. While the data server 123 is illustrated as a separate entity in the system 100, in other embodiments, the data server 123 may be integrated with other devices in the system 100 such as the radio controller 121, other devices in the system infrastructure 103 such as a zone controller, and/or may otherwise be accessible via one or more of the external types of networks noted above.

Figure 2:
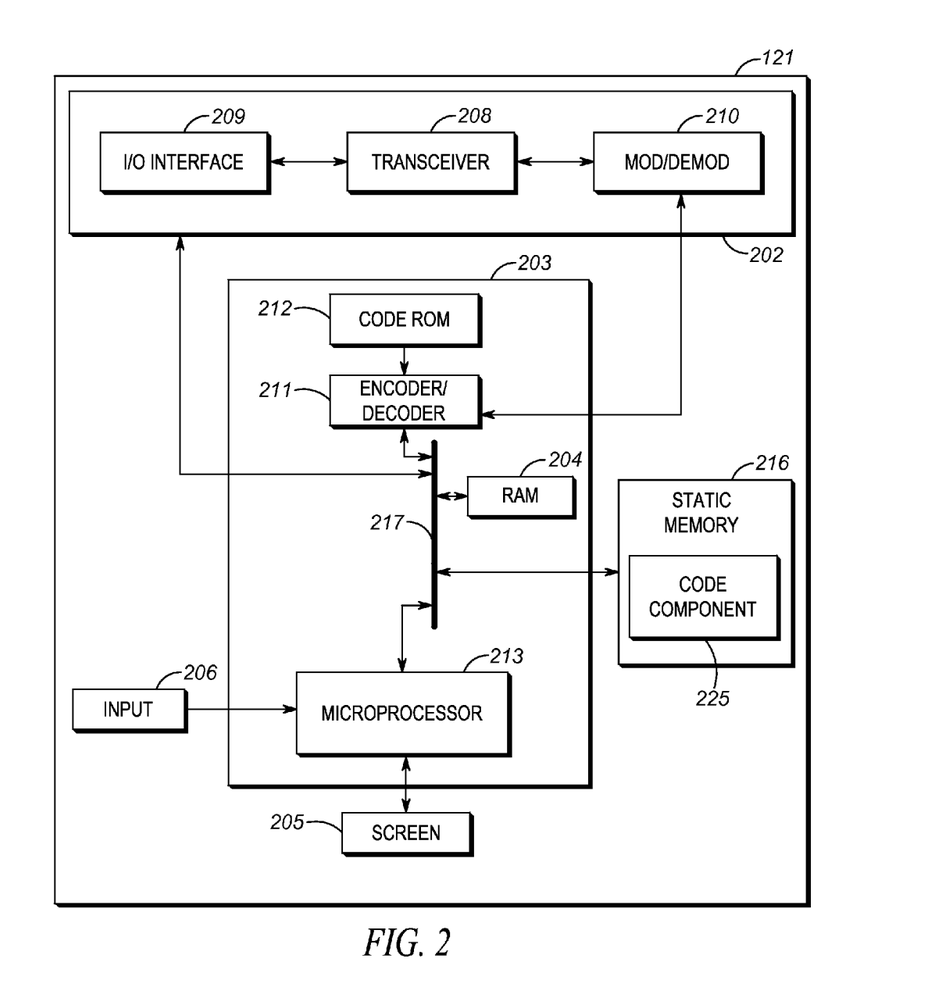
FIG. 2 is a block diagram of a radio controller in accordance with some embodiments.

FIG. 2 is an example functional block diagram of a radio controller 121 operating within the system 100 of FIG. 1 in accordance with some embodiments. As shown in FIG. 2, radio controller 121 includes a communications unit 202 coupled to a common data and address bus 217 of a processing unit 203. The radio controller 121 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for initializing system components, and encoding and/or decoding voice, data, control, or other signals that may be transmitted or received between the radio controller and BSs or MSs in the system 100. The processing unit 203 may further include a microprocessor 213 coupled, by the common data and address bus 217, to the encoder/decoder 211, a Random Access Memory (RAM) 204, and a static memory 216.

The communications unit 202 may include one or more wired or wireless input/output (I/O) interfaces 209 that are configurable to communicate with MSs such as MSs 105, 109, 155, 159 with BSs such as BS 101, and/or with other devices in or communicably coupled to the system infrastructure 103. The communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless radio network. The communications unit 202 may additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. Static memory 216 may store operating code for the microprocessor 213 that, when executed, performs one or more of the processing, transmitting, and/or receiving steps set forth in FIGS. 4-5 and accompanying text. Static memory 216 may also store, permanently or temporarily, group subscription information that, for each group identifier associated with a particular group of MSs, identifies MSs that are members of the particular group. Additionally or alternatively, static memory 216 may also store, permanently or temporarily, transmit power level information associated with one or both of particular groups of MSs and particular traffic channels. Other types of information could be tracked and/or stored in static memory 216 as well.

Static memory 216 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few.

Figure 3:
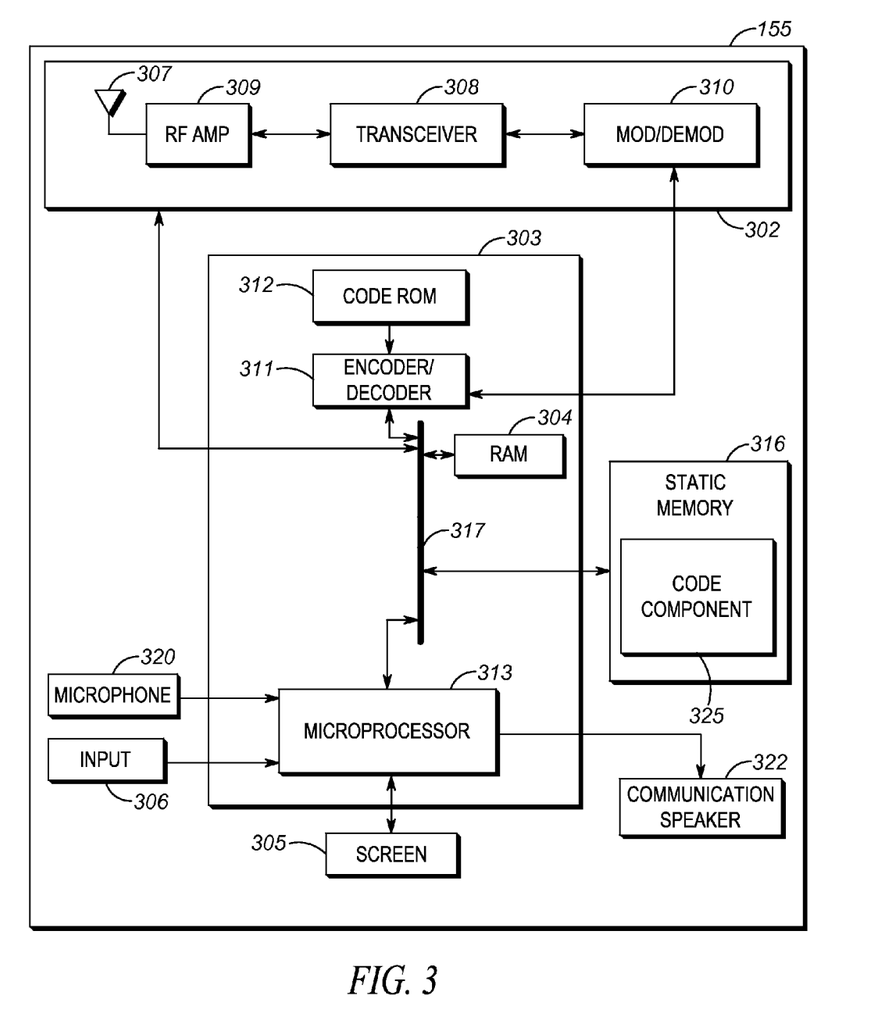
FIG. 3 is a block diagram of a mobile station in accordance with some embodiments.

FIG. 3 is an example functional block diagram of a MS such as MS 155 operating within the system 100 of FIG. 1 in accordance with some embodiments. Other MSs such as MSs 105, 109, and 159 may contain same or similar structures. As shown in FIG. 3, MS 155 comprises a radio frequency communications unit 302 coupled to a common data and address bus 317 of a processing unit 303. The MS 105 may also include an input 306 and a display screen 305, each coupled to be in communication with processing unit 303. A microphone 320 captures audio from a user that is further vocoded by processing unit 303 and transmitted as voice data by communication unit 302 to other MSs or the infrastructure. A communications speaker 322 reproduces audio that is decoded from voice data transmissions received from other MSs via the communications unit 302.

The processing unit 303 may also include an encoder/decoder 311 with an associated code Read Only Memory (ROM) 312 for storing data for initializing system components and encoding and/or decoding voice or other traffic information (including image data, audio data, video data, control signals, etc.) that may be transmitted or received by the MS 155. The processing unit 303 may further include a microprocessor 313 coupled, by the common data and address bus 317, to the encoder/decoder 311, a RAM 304, and a static memory 316.

The radio frequency communications unit 302 is a combined receiver and transmitter (e.g., transceiver) having a common antenna 307. The radio frequency communications unit 302 has a transceiver 308 coupled to the antenna 307 via a radio frequency amplifier 309. The transceiver 308 may be a transceiver operating in accordance with one or more standard protocols, such as a DMR transceiver, a P25 transceiver, a TETRA transceiver, a Bluetooth transceiver, an LTE transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The transceiver 308 is also coupled to a combined modulator/demodulator 310 that is coupled to the encoder/decoder 311.

The microprocessor 313 has ports for coupling to the input 306 and to the display screen 305. The microprocessor 313 further has ports for coupling to the microphone 320 and to the speaker 322. In some embodiments of the present disclosure, the static memory 316 may store operating code for the microprocessor 313 that, when executed by the microprocessor 313, perform one or more of the MS processing, transmitting, and/or receiving steps set forth in FIGS. 4-5 and accompanying text. Static memory 316 may comprise, for example, a HDD, an optical disk drives such as a CD drive or DVD drive, a SSD, a tape drive, a flash memory drive, or a tape drive, to name a few.

II. Process of Adjusting Base Station Transmit Power to Reduce Power Consumption FIG. 4 sets forth a ladder diagram 400 illustrating process steps and message transmissions and receptions for adjusting base station transmit power to reduce power consumption. Of course, additional steps, receptions, and/or transmissions not disclosed herein could be additionally added before, after, in-between or in place of steps, receptions, and/or transmissions disclosed in FIG. 4, and the presence of such additional or replacement steps, receptions, and/or transmissions would not negate the purpose and advantages of the examples set forth in detail throughout the remainder of this disclosure.

Figure 4:
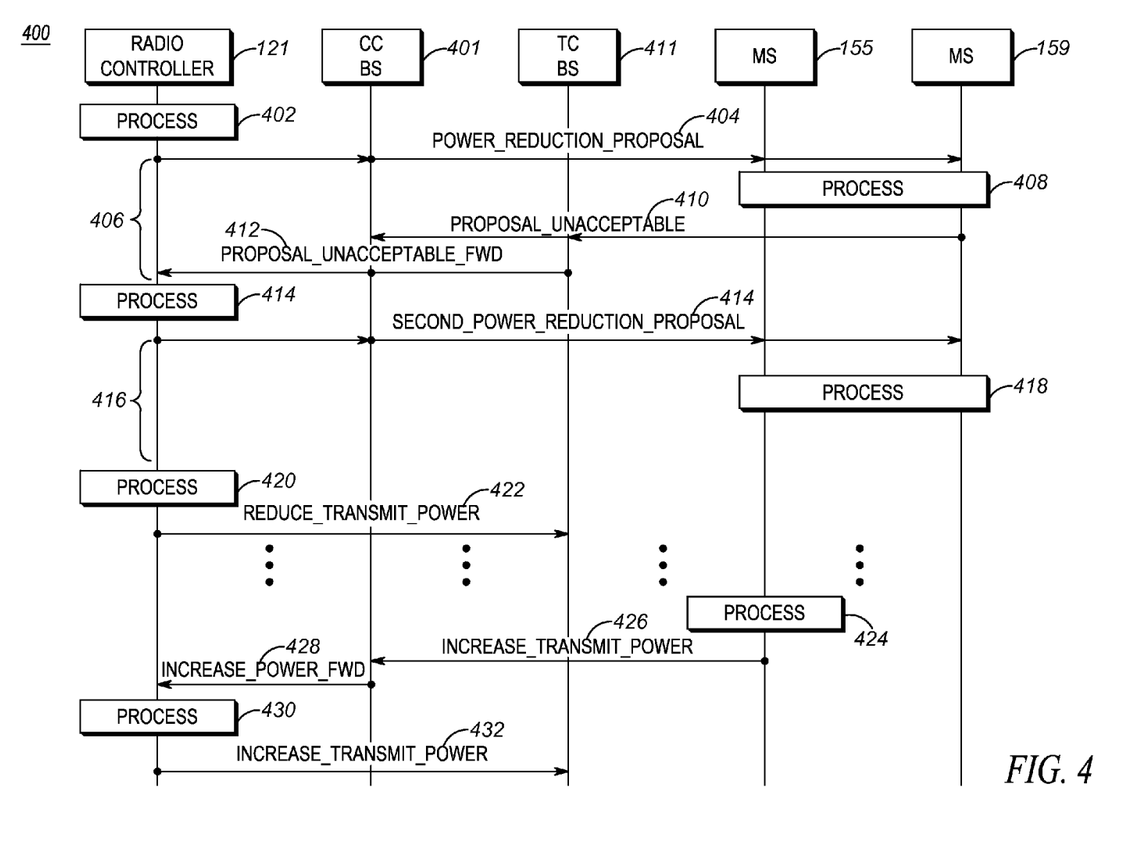
FIG. 4 is a ladder diagram illustrating processing steps and message transmissions and receptions executable at the radio controller of FIG. 2 and the mobile station of FIG. 3 for adjusting base station transmit power to reduce power consumption in accordance with an embodiment.

FIG. 4, in particular, illustrates processes and message transmissions and receptions between a radio controller 121, a control channel (CC) base station 401, a traffic channel (TC) base station 411, and mobile stations 155 and 159 that, for this example, are associated with or subscribed to a group G_A. While separate devices are shown for the CC and TC base stations 401, 411, in practice, these may be physically separate devices or a same device. If combined into a single device, different transceiver chains may be used to operate the respective control channel and traffic channel transmit and receive functions. In any event, it is assumed that the CC and TC base stations 401, 411 are operating off of a same power source, such that transmit power savings at TC BS 411 may reduce power consumption and/or increase the number of carriers that may be supported between the BSs 401, 411. Further, while in some embodiments a single BS may support multiple carriers, in this example, TC BS 411 is illustrated as providing a single outgoing (downlink) carrier between the BS and the MSs it serves.

At step 402, the radio controller 121 determines to transmit a power reduction proposal relative to a specific traffic channel transmitted by TC BS 411. The determination to transmit the power reduction proposal may be based on the triggering of a timer that causes a periodic or semi-periodic (e.g., intermittent) power reduction proposal to be transmitted for each available traffic channel to which the CC BS 401 may assign or has assigned a call (e.g., group or private call supporting voice and/or data). In another example, the determination to transmit the power reduction proposal may be in response to receiving a call request. For example, MS 155 may transmit a call request to CC BS 401, which then forwards the request to radio controller 121. The radio controller 121 may then determine to include, in a corresponding call grant or in a separate message transmitted shortly before or after the call grant, a power reduction proposal relative to the newly granted or to-be-granted call.

The radio controller 121 subsequently causes a Power_Reduction_Proposal 404 message to be transmitted via CC BS 401. In this example, the Power_Reduction_Proposal 404 message is targeted to a group G_A of MSs 155, 159, and may identify the group G_A within the message itself. The Power_Reduction_Proposal 404 message may itself be an initial or subsequent call grant message, or may be a separate proprietary or standards-based message requesting a reduction in power on a TC BS 411 assigned to or to be assigned to a call associated with the G_A of MSs 155, 159. The transmitting of the Power_Reduction_Proposal 404 message starts a first window of time 406 during which the radio controller 121 monitors, via CC BS 401 and/or TC BS 411, for indications from MSs impacted by the Power_Reduction_Proposal 404 message (e.g., MSs 155, 159 in G_A in this example) that the proposed reduction in transmit power is unacceptable. The radio controller 121 may, for example, set an internal timer that counts down from a pre-configured time or counts up to a pre-configured time and, upon expiration, triggers some form of interrupt at the radio controller. If no indications of the unacceptable nature of the proposal are received from any one or more impacted MSs during the first window of time 406, the radio controller 121 may proceed with implementing the proposed reduction in transmit power. The duration of the first window of time 406 may be pre-configured at the radio controller 121 and/or MSs 155, 159, or may determined statically or dynamically by the radio controller 121 and specified in the Power_Reduction_Proposal 404 message itself, among other possibilities.

At step 408, the MSs 155 and 159 receive the Power_Reduction_Proposal 404 message over the control channel and determine whether the proposed reduction in transmit power included in or represented by the Power_Reduction_Proposal 404 message would be acceptable given one or more other parameters or conditions associated with receipt of the Power_Reduction_Proposal 404 message. It is assumed that the Power_Reduction_Proposal 404 message is transmitted over the control channel at a first power level (which may or may not be a "full" or "maximum" available power level) by the CC BS 401, and the contents of the Power_Reduction_Proposal 404 message propose that the traffic channel transmitted via TC BS 411 be transmitted at some reduced power level relative to the first power level. The Power_Reduction_Proposal 404 message may identify the traffic channel explicitly by index, code, color, frequency, channel, or some other mechanism, or may implicitly identify the traffic channel assigned to or to-be-assigned to the group G_A by reference to a group identifier associated with the group G_A.

The Power_Reduction_Proposal 404 message may propose a reduction in a number of different ways, such as specifying a percent reduction (e.g., 10%, 30%, or 50%) or decibel reduction (e.g., 3, 6, dB) in transmit power, specifying an actual reduction in transmit power (e.g., current and proposed transmit power as measured in watts), or specifying a reduction in some other parameter related to the transmission (e.g., current and proposed transmit power parameter in amps, volts, etc.), among other possibilities. If current and proposed transmit power or transmit power parameters are specified, the MS 159 may calculate its own estimated percent reduction value from the provided information, perhaps using some other weighting factors depending on the type of information provided.

In other embodiments, the Power_Reduction_Proposal 404 message may not include any expressed proposal, but may imply or indicate a preconfigured proposed reduction. For example, MSs 155, 159 may be configured to treat receipt of each Power_Reduction_Proposal 404 message as a fixed 5%, 10%, 20%, or 25% reduction proposal, and additional subsequent Power_Reduction_Proposal 404 messages may be sent to reach a cumulative overall reduction that is a multiple of the fixed per-message amount.

In some embodiments, the reduction proposed in the Power_Reduction_Proposal 404 message may be based on an association stored at the radio controller 121 between one of the group G_A and the assigned traffic channel for the call, perhaps based on a last-set transmit power level or an historical average transmit power level for that group or specified traffic channel. Other possibilities exist as well.

After receipt of the Power_Reduction_Proposal 404 message, each MS 155, 159 may then determine, as a function of a measured RSSI of the control channel and a preconfigured or dynamically determined minimum receive signal strength, a link margin that represents how much of a reduction in transmit power it could tolerate. The preconfigured minimum receive signal strength acceptable at the receiving MS may be determined at a time of manufacture based on operating characteristics of a particular RF receive chain included in the MS. The dynamically determined minimum receive signal strength may be determined over a period of time in which the receiving MS identifies a minimum receive signal strength it has detected over that period of time at or above which a minimum threshold bit error rate is met or exceeded. Other mechanisms are possible as well.

Once the link margin is determined relative to the control channel, the receiving MS compares the link margin with the proposed reduction in transmit power. If the link margin is greater than the proposed reduction, then the receiving MS determines that it could tolerate the reduction and no indication of the unacceptable nature of the proposed reduction in transmit power is sent back to the radio controller 121. If, on the other hand, the proposed reduction is greater than the link margin, then the receiving MS determines that it could not tolerate the proposed reduction (e.g., such a reduction would lead to an intolerable increase in bit error rate, or some other receive parameter) and an indication of the unacceptable nature of the proposal should be sent on one of the control channel and a traffic channel assigned to the MS or group.

In this example, MS 155 determines during step 408 that the proposed reduction included in or indicated by the Power_Reduction_Proposal 404 message is acceptable, and refrains from transmitting any indication of an unacceptable nature of the proposed reduction during time period 406. At the same time, MS 159 determines during step 408 that the proposed reduction included in or indicated by the Power_Reduction_Proposal 404 message is unacceptable, and transmits a Proposal_Unacceptable 410 message on one or both of the control channel via CC BS 401 and the traffic channel assigned to the group G_A via TC BS 411. The CC BS 401 then forwards the message or otherwise indicates the receipt of transmitted RF energy during time period 406 as Proposal_Unacceptabled_FWD 412 message and/or the TC BS 411 forwards the message or otherwise indicates the receipt of transmitted RF energy during time period 406 as Proposal_Unacceptabled_FWD 412 message.

In one example, the Proposal_Unacceptable 410 message may simply as an indication that the transmit power reduction included in or indicated by the Power_Reduction_Proposal 404 is unacceptable, with no further information or counter-proposals included therein. In this case, MSs may transmit the Power_Reduction_Proposal 404 at will without sensing the availability of an uplink portion of the control channel or specified traffic channel first during time period 406, such that the mere receipt of RF energy above some threshold level of background noise (e.g., allowing for collisions with other MSs transmitting the Proposal_Unacceptable 410 message at the same time) is sufficient to indicate that the proposed reduction is unacceptable to at least one MS.

In other embodiments, the Proposal_Unacceptable 410 message may include a counter-proposal or other information that sets forth some amount of transmit power reduction less than the MS determined link margin, or may include information indication that no amount of reduction would be acceptable to the MS. In this case, MSs may transmit the Power_Reduction_Proposal 404 using some form of random access mechanism, such as carrier sense multiple access (CSMA), in order to ensure that indications of the unacceptable nature of the proposal do not collide with other MSs and that information included in the response makes it to the radio controller 121.

At step 414, the radio controller 121 receives and processes the Proposal_Unacceptable_FWD 412 message. In some embodiments, the radio controller may actually receive and decode the Proposal_Unacceptable_FWD 412 message, including any counter-proposals if present. In other embodiments, the Proposal_Unacceptabled_FWD 412 message may simply indicate a detection of RF energy by the respective BS 401, 411 during the time period 406, and may not include any otherwise decodable or recognizable information received from MSs 155, 159.

In response to receiving the Proposal_Unacceptabled_FWD 412 message, radio controller 121 revises its power reduction proposal lower (if possible) and transmits a Second_Power_Reduction_Proposal 414 message via CC BS 401. The reduction in power may be a preconfigured step down in value, such as from 30% to 20% or 6 dB to 4 dB, relative to the Power_Reduction_Proposal 404. In another embodiment, the reduction in power may be associated with (including being identical to) a counter-proposal provided by a MS that received the first Power_Reduction_Proposal 404.

The Second_Power_Reduction_Proposal 414 message is again targeted to the group G_A of MSs 155, 159, and may identify the group G_A within the message itself. The Second_Power_Reduction_Proposal 414 message may be a re-transmitted call grant message, or may be a separate proprietary or standard message requesting a reduction in power on a TC BS 411 assigned to or to be assigned to a call associated with the group G_A of MSs 155, 159. The transmitting of the Second_Power_Reduction_Proposal 414 message starts a second window of time 416 during which the radio controller monitors, via CC BS 401 and/or TC BS 411, for indications from MSs impacted by the Second_Power_Reduction_Proposal 414 message that the proposed reduction in power is unacceptable. The radio controller 121 may, for example, set an internal timer that counts down from a pre-configured time or counts up to a pre-configured time and, upon expiration, triggers some form of interrupt at the radio controller. If no indications of the unacceptable nature of the proposal are received from any one or more impacted MSs during the second window of time 416, the radio controller 121 may proceed with implementing the second proposed reduction in transmit power. The duration of the second window of time 416 may again be pre-configured at the radio controller 121 and/or MSs 155, 159, or may determined statically or dynamically by the radio controller 121 and specified in the Second_Power_Reduction_Proposal 414 message itself, among other possibilities.

At step 418, the MSs 155 and 159 receive the Second_Power_Reduction_Proposal 414 message over the control channel and determine whether the second proposed reduction in transmit power included in or represented by the Second_Power_Reduction_Proposal 414 message would be acceptable given one or more other parameters or conditions associated with receipt of the Second_Power_Reduction_Proposal 414 message. It is again assumed that the Second_Power_Reduction_Proposal 414 message is transmitted over the control channel at the first power level (which may or may not be a "full" or "maximum" available power level) by the CC BS 401, and the contents of the Second_Power_Reduction_Proposal 414 message propose that the traffic channel transmitted via TC BS 411 be transmitted at some second reduced power level relative to the first power level.

The Second_Power_Reduction_Proposal 414 message may propose the transmit power reduction in a number of different ways, as set forth above with respect to the Power_Reduction_Proposal 404.

After receipt of the Second_Power_Reduction_Proposal 414 message, each MS 155, 159 may then determine, as a function of a measured RSSI of the control channel and a preconfigured or dynamically determined minimum receive signal strength, a link margin that represents how much of a reduction in transmit power it could tolerate. In some embodiments, MSs may re-use previously calculated link margins, and only re-calculate a link margin upon request or after passage of a threshold period of time.

Once the link margin is determined relative to the control channel, the receiving MS compares the link margin with the proposed reduction in transmit power (specified in the Second_Power_Reduction_Proposal 414 message or calculated by the receiving MS based on other information included in the Second_Power_Reduction_Proposal 414 message, as set forth above). If the link margin is greater than the proposed reduction, then the receiving MS could tolerate the reduction and no indication of the unacceptable nature of the proposal is sent. If, on the other hand, the proposed reduction is greater than the link margin, then the receiving MS could not tolerate the reduction (e.g., such a reduction would lead to an intolerable increase in bit error rate, or some other receive parameter) and an indication of the unacceptable nature of the proposal should be sent on one of the control channel and a traffic channel assigned to the receiving MS or group.

In this example, MS 155 determines during step 418 that the second proposal included in or indicated by the Second_Power_Reduction_Proposal 414 message is acceptable, and refrains from transmitting any indication of an unacceptable nature of the second proposal during second time period 416. At the same time, MS 159 determines during step 418 that the second proposal included in or indicated by the Second_Power_Reduction_Proposal 414 message is acceptable, and similarly refrains from transmitting any indication of an unacceptable nature of the second proposal during second time period 416.

At step 420, in response to expiration of the timer associated with second time period 416, the radio controller 121 determines that the lack of receipt of any indication of the unacceptable nature of the second proposal set forth in or indicated by the Second_Power_Reduction_Proposal 414 is indicative that the second proposed reduction in transmit power for TC BS 411 is acceptable to all affected MSs. Accordingly, and responsively, radio controller 121 transmits a Reduce_Transmit_Power 422 message to TC BS 411 instructing it to reduce a transmit power of its corresponding traffic channel (that has already been established and is carrying active call traffic or is newly assigned to carry future call traffic associated with one or more of MSs 155, 159 and/or Group G_A). The radio controller 121 may also store an indication of the reduced power level and associate the reduced power level with one of the group G_A and the traffic channel of TC BS 411.

Although FIG. 4 illustrates only a single iteration of power reductions in FIG. 4, in other embodiments, additional iterations may be executed until an acceptable reduced transmit power level is found that is acceptable to all MSs affected by the reduction (for example, all MSs in a group of MSs assigned to a particular traffic channel). In some embodiments, no acceptable reduced transmit power level may be found, and the TC BS 411 may continue transmitting at a power level substantially equivalent to the power level of the CC BS 409.

As time passes, and as MSs move within a coverage area of TC BS 411, one or more MSs being served by TC BS 411 may determine that it is nearing a fringe of a transmit range of the TC BS 411 (e.g., that it is in a fade condition). In the example of FIG. 4, MS 155 knows from prior received messages (here, the Second_Power_Reduction_Proposal 414) that the TC BS 411 is operating at a reduced transmit power level. In order to ensure continued receipt of a call being communicated via the TC BS 411, and in response to the determined fade condition, MS 155 may determine at step 424 that it should request an increase in transmit power. Accordingly, MS 155 transmits an Increase_Transmit_Power 426 message to CC BS 401 via its corresponding control channel requesting an increase in the transmit power of TC BS 411. The CC BS 401 then forwards the message to the radio controller 121 via the Increase_Power_Fwd 428 message. The Increase_Transmit_Power 426 message may identify the TC BS 411 or its associated traffic channel by traffic channel identifier, hardware ID, IP address, or some other identifier. In other embodiments, the radio controller 121 may determine the identity of the TC BS 411 or its associated traffic channel as a function of the identify of the MS transmitting the Increase_Transmit_Power 426 message, knowledge of active calls and their assigned traffic channels, and the transmitting MS's group membership.

At step 430, the radio controller 121 processes the message, and responsively transmits an Increase_Transmit_Power 430 message to TC BS 411 requesting that the BS increase its transmit power. In some embodiments, the Increase_Transmit_Power 430 message may specify the new increased transmit power, while in other embodiments, the TC BS 411 may return to maximum transmit power or increment transmit power by a pre-determined amount in response to receiving the Increase_Transmit_Power 430 message.

Each of the messages Power_Reduction_Proposal 404, Proposal_Unacceptable 410, Second_Power_Reduction_Proposal 414 and Increase_Transmit_Power 424 sent over the air may take the form of a proprietary message, an ETSI-DMR standards-compliant control signaling block (CSBK) or APCO-P25 standards-compliant trunking signaling block (TSBK) for LMR systems, or a standards-compliant or proprietary message for broadband systems.

While FIG. 4 illustrates a messaging process in which the radio controller 121 initially transmits a highest transmit power reduction proposal and then backs off of that initial proposal in subsequent messages setting forth reduced transmit power reductions until no MSs transmit a message indicating that the reduction is unacceptable, other methods are possible as well. For example, the radio controller 121 may instead transmit a lowest incremental transmit power reduction proposal and then increase the proposal from that initial proposal in subsequent messages until a first MS transmits a message indicating that the reduction is unacceptable, after which time the radio controller 121 rolls back to the transmit power reduction of the last proposal sent in which no MS transmitted a message indicating that the reduction was unacceptable. In still further embodiments, the radio controller 121 may start at a mid-way point transmit power reduction proposal and proceed up or down in transmit power reduction proposals based on a response (or lack thereof) to the initial mid-way point proposal.

Figure 5:
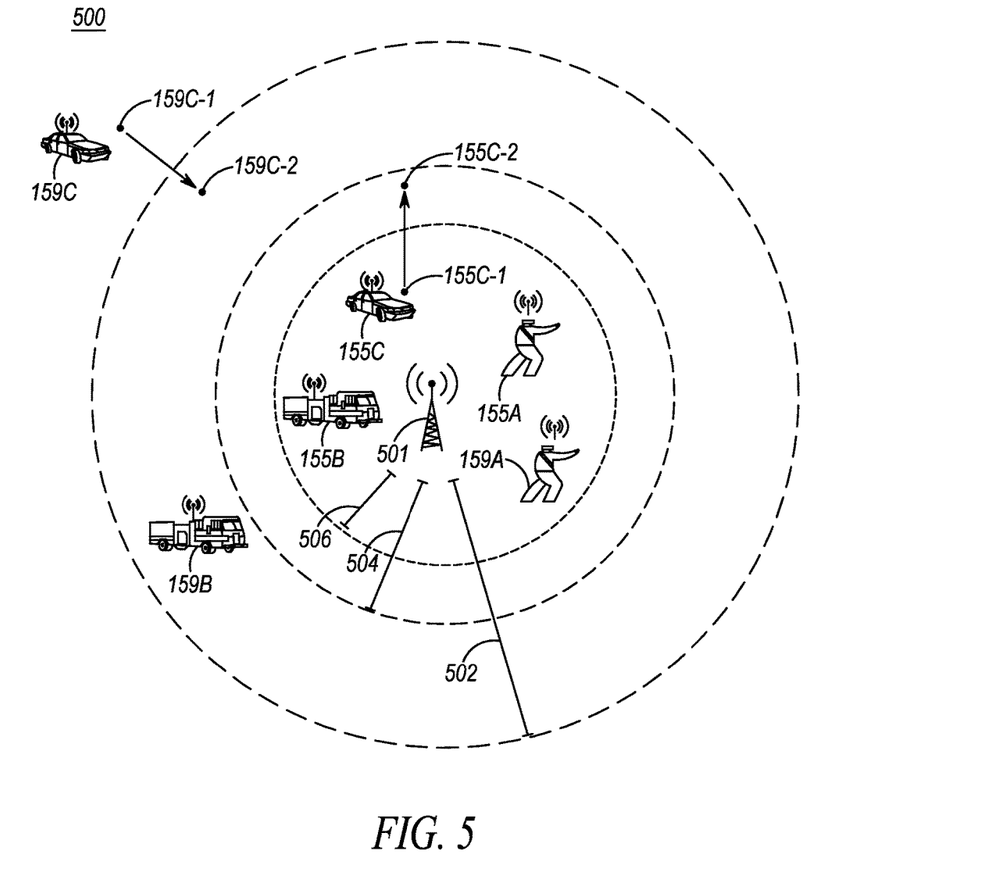
FIG. 5 is a schematic diagram of various example mobile station geographical locations and associations that may impact base station transmit power adjustments in accordance with some embodiments.

FIG. 5 is a schematic diagram of various example MS geographical locations and group associations that may impact BS transmit power adjustments at a radio site 500 in accordance with some embodiments. Several sets of groups of MSs are illustrated in FIG. 5, including a set 155A and 159A belonging to a group of patrol officers, a set 155B and 159B belonging to a group of firemen in vehicles, and a set 155C and 159C belonging to a group of police officers in vehicles. Each of MSs 155A-C may operate the same as or similar to MS 155 of FIG. 4, and each of MSs 159A-C may operate the same as or similar to MS 159 of FIG. 4. A TC BS 501 illustrated at the center of FIG. 5 is a TC BS that may operate the same as or similar to TC BS 411 of FIG. 4. A separate CC BS and a separate radio controller are also present but are not illustrated in FIG. 5. The TC BS 501 is shown as capable of transmitting a downlink TC at three different transmit power level ranges (associated with corresponding different transmit power levels), including a highest transmit power level range 502 that is substantially equivalent to a transmit power at which a CC is transmitted in FIG. 5, a first reduced transmit power level range 504, and a second further reduced transmit power level range 506. The highest transmit power level range 502 may be, for example, a 0.1-200 W full BS transmit power, the first reduced transmit power level range 504 may be, for example, 1-3 dB lower than full BS transmit power, and the second further reduced transmit power level range 506 may be, for example, 2-6 dB lower than full BS transmit power. Other power level ranges and additional further reductions could be used as well. Further, while the transmit power level ranges 502-506 are illustrated as circular in FIG. 5 for illustrative purposes, in practice, such transmit ranges have irregular shapes as a function of geographic terrains and features not illustrated in the figure.

In a first example operation, MSs 155A and 159A form a group G_A (of which they are the only members in the radio site 500 depicted in FIG. 5) and may request a new group G_A call or be already participating in a group G_A call via TC BS 501 at the highest transmit power level range 502. During the call setup or at some time thereafter, the radio controller causes the CC BS operating at radio site 500 to transmit a first power reduction proposal to the G_A members proposing a transmit power reduction from the highest transmit power level range 502 to the first reduced transmit power level range 504. Because both G_A group members 155A and 159A reside within the second further reduced transmit power level range 506, neither MS 155A, 159A transmits an indication of the unacceptable nature of the proposed transmit power reduction and, in response, TC BS 501 is instructed by the radio controller to reduce, and actually does reduce, its transmit power level to the first reduced transmit power level range 504.

In some embodiments, and again during the call setup or at some time thereafter, the radio controller further causes the CC BS operating at radio site 500 to transmit a second power reduction proposal to the G_A members proposing a further reduction from the first reduced transmit power level 504 to the second further reduced transmit power level 506. Because both G_A group members 155A and 159A reside within the second further reduced transmit power level range 506, neither MS 155A, 159A transmits an indication of the unacceptable nature of the proposed reduction and, in response, TC BS 501 is instructed by the radio controller to reduce, and actually does reduce, its transmit power level to the second further reduced transmit power level range 506. In other embodiments, the CC BS may first propose a largest transmit power reduction (here, the second further reduced transmit power level range 506) and then back off to smaller transmit power reductions as necessary until a transmit power reduction is reached (if any) in which no MSs transmit a message indicating that such a reduction is unacceptable.

In a second example operation, MSs 155B and 159B form a group G_B (of which they are the only members in the radio site 500 depicted in FIG. 5) and may request a new group G_B call or be already participating in a group G_B call via TC BS 501 at the highest transmit power level range 502. During the call setup or at some time thereafter, the radio controller causes the CC BS operating at radio site 500 to transmit a first power reduction proposal to the G_B members proposing a reduction from the highest transmit power level 502 to the first reduced transmit power level 504. Because G_B group member 159B resides outside of the first reduced transmit power range 504, it transmits an indication of the unacceptable nature of the proposed reduction and, in response, TC BS 501 is not instructed by the radio controller to reduce, nor does it actually reduce, its transmit power level to the first reduced transmit power level range 504.

In some embodiments, in response to receiving the proposed reduction, MS 159B may transmit a counter-proposal to the radio controller that indicates a transmit power level range somewhere between that indicated via ranges 502 and 504 and, if acceptable, TC BS 501 may be instructed by the radio controller to adjust its transmit power level to a corresponding reduced transmit power level.

In a third example operation, MSs 155C and 159C form a group G_C (of which they are the only members in or near the radio site 500 depicted in FIG. 5), and of which only MS 155C is currently active in a G_C call via TC BS 501 (because MS 159C is out of range of even the highest transmit power level range 502 available via TC BS 501). MS 159C may be participating in the G_C call via another TC BS not illustrated in FIG. 5, or may be unaware of the availability of the G_C call. Furthermore, let us assume that TC BS 501 is currently transmitting at the second further reduced transmit power range 506 as a result of a prior transmit power reduction process. As MS 155C moves from location 155C-1 to 155C-2, it may begin to experience a fade. Because MS 155C participated in the transmit power reduction process, it knows that TC BS 501 is transmitting at a reduced power level. Accordingly, and as a result of the detected fade, it may transmit a request to the radio controller via the CC BS at radio site 500 requesting an increase in the transmit power of TC BS 501 as it moves towards location 155C-2. In response, the TC BS 501 is instructed by the radio controller to increase its transmit power to the first reduced transmit power range 504, and the MS 155C may then continue to receive the G_C call at its new location 155C-2, while TC BS 501 continues to save power by transmitting at the first reduced transmit power range 504.

Let us further assume that MS 159C moves from its current out-of-range location 159C-1 to location 159C-2. Once within range of the CC BS at radio site 500, MS 159C may discover that there is an ongoing call for group G_C via a periodic or semi-periodic call announcement caused to be broadcast over the control channel by the radio controller, the call announcement announcing the existence of the ongoing group call and identifying the traffic channel assigned to the G_C group call. The announcement may indicate that the G_C call is being transmitted at a reduced power, or MS 159C may determine as much based on its ability to receive the announcement over the control channel and its inability to receive the G_C call via the assigned TC BS 501. In response, MS 159C may transmit a request to the radio controller via the CC BS at radio site 500 requesting an increase in the transmit power of TC BS 501. Responsive to receiving the request, the radio controller may instruct TC BS 501 to increase its transmit power to the highest transmit power range 502, and as a result, both MSs 155C and 159C can receive the G_C call via TC BS 501 at their new respective locations.

3. Conclusion

In accordance with the foregoing, an improved method and apparatus for adjusting base station transmit power in RANs may be realized so as to further reduce power consumption and/or increase the number of available carriers in the RANs. As a result, a more robust, useful, and efficient group communications system can be provided, improving communication capabilities and services provided to incidence response groups. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for adjusting base station transmit power to reduce power consumption in a wireless radio system, the method comprising:

causing, by a radio controller, a transmit power reduction proposal message to be transmitted on a downlink portion of a wireless control channel between a first base station and mobile stations operating in the wireless radio system at a first transmit power level, for receipt by the mobile stations, proposing a transmit power reduction to lower than the first transmit power level with respect to a downlink portion of a wireless traffic channel between a second base station and the mobile stations operating in the wireless radio system, an amount of the proposed transmit power reduction identified via the transmit power reduction proposal message relative to the first transmit power level at which the transmit power reduction proposal message is transmitted;

monitoring, by the radio controller, one or both of an uplink portion of the wireless control channel between the first base station and the mobile stations operating in the wireless radio system and an uplink portion of the wireless traffic channel between a second base station and the mobile stations operating in the wireless radio system for an indication transmitted from any mobile station that would be affected by the proposed power reduction indicating that the amount of the proposed transmit power reduction is unacceptable; and when the indication is not received by the radio controller for a pre-configured period of time after the transmit power reduction proposal message is transmitted, subsequently reducing, by the radio controller, the transmit power of the downlink portion of the wireless traffic channel to a reduced transmit power level lower than the first transmit power level by the proposed transmit power reduction by the amount of the proposed transmit power reduction identified in the transmit power reduction proposal message; and when the indication is received by the radio controller during the pre-configured period of time after the transmit power reduction proposal message is transmitted, subsequently refraining from reducing, by the radio controller, the transmit power of the downlink portion of the wireless traffic channel by the amount of the proposed transmit power reduction identified in the transmit power reduction proposal message.

2. The method of claim 1, further comprising, responsive to receiving the indication during the pre-configured period of time:

causing, by the radio controller, a second transmit power reduction proposal message to be transmitted on the downlink portion of the wireless control channel between the first base station and the mobile stations operating in the wireless radio system at the first transmit power level proposing a second transmit power reduction on the downlink portion of the wireless traffic channel between a second base station and the mobile stations operating in the wireless radio system, the amount of the proposed second transmit power reduction identified via the second transmit power reduction proposal message relative to the first transmit power level at which the second transmit power reduction proposal message is transmitted is less than the amount of the proposed transmit power reduction.

3. The method of claim 2, further comprising again monitoring, by the radio controller, one or both of the uplink portion of the wireless control channel between the first base station and the mobile stations operating in the wireless radio system and the uplink portion of the wireless traffic channel between the second base station and the mobile stations operating in the wireless radio system for a second indication transmitted from any mobile station that would be affected by the second proposed transmit power reduction indicating that the amount of the proposed second transmit power reduction is unacceptable.

4. The method of claim 3, wherein the second proposed transmit power reduction is a function of a mobile station counter-proposed transmit power reduction received at the radio controller via one of the uplink portion of the wireless control channel between the first base station and the mobile stations operating in the wireless radio system and uplink portion of the wireless traffic channel between the second base station and the mobile stations operating in the wireless radio system in response to the transmission of the proposed transmit power reduction.

5. The method of claim 1, wherein the first transmit power is a maximum transmit power of the first base station that is broadcasting the downlink portion of the wireless control channel between the first base station and the mobile stations operating in the wireless radio system.

6. The method of claim 1, wherein the transmit power reduction proposal message specifies a window of time equal to the pre-configured period of time on one of the uplink portion of the wireless control channel between the first base station and the mobile stations operating in the wireless radio system and uplink portion of the wireless traffic channel between the second base station and the mobile stations operating in the wireless radio system for mobile stations to transmit the indication that the proposed transmit power reduction is unacceptable;

wherein the monitoring comprises monitoring for transmitted radio frequency (RF) energy above a threshold level during the specified window of time without decoding information represented by the RF energy; and wherein the absence of the indication is a detected absence of transmitted RF energy during the specified window of time.

7. The method of claim 1, wherein the downlink portion of the wireless traffic channel between the first base station and the mobile stations operating in the wireless radio system is associated with a group of mobile stations assigned to the wireless traffic channel, and wherein mobile stations that would be affected by the proposed transmit power reduction are associated with the group.

8. The method of claim 1, wherein the transmit power reduction proposal message is an initial or periodically re-broadcast group call announcement associated with a call assigned to the wireless traffic channel between the second base station and the mobile stations operating in the wireless radio system.

9. The method of claim 1, wherein when the indication is not received and the transmit power of the downlink portion of the wireless traffic channel is reduced, the method further comprising:

subsequently receiving, at the radio controller and from a first mobile station via the uplink portion of the wireless control channel between the first base station and the mobile stations operating in the wireless radio system, a request to increase transmit power of the downlink portion of the wireless traffic channel, and responsively increasing the transmit power of the downlink portion of the wireless traffic channel to above the reduced transmit power level.

10. A radio controller in a wireless radio system, the controller comprising:

a transceiver;

a data store; and one or more processors configured to:

cause a transmit power reduction proposal message to be transmitted on a downlink portion of a wireless control channel between a first base station and mobile stations operating in the wireless radio system at a first transmit power level, for receipt by the mobile stations, proposing a transmit power reduction to lower than the first transmit power level with respect to a downlink portion of a wireless traffic channel between a second base station and the mobile stations operating in the wireless radio system, an amount of the proposed transmit power reduction identified via the transmit power reduction proposal message relative to the first transmit power level at which the transmit power reduction proposal message is transmitted;

monitor, via the transceiver, one or both of an uplink portion of the wireless control channel between the first base station and the mobile stations operating in the wireless radio system and an uplink portion of the wireless traffic channel between a second base station and the mobile stations operating in the wireless radio system for an indication transmitted from any mobile station that would be affected by the proposed power reduction indicating that the amount of the proposed transmit power reduction is unacceptable; and when the indication is not received, by the radio controller via the transceiver, for a pre-configured period of time after the transmit power reduction proposal message is transmitted, subsequently reduce the transmit power of the downlink portion of the wireless traffic channel to a reduced transmit power level lower than the first transmit power level by the proposed transmit power reduction by the amount of the proposed transmit power reduction identified in the transmit power reduction proposal message; and when the indication is received, by the radio controller via the transceiver, during the pre-configured period of time after the transmit power reduction proposal message is transmitted, subsequently refraining from reducing the transmit power of the downlink portion of the wireless traffic channel by the amount of the proposed transmit power reduction identified in the transmit power reduction proposal message.

11. The radio controller of claim 10, wherein the processor is further configured to, responsive to detecting the indication during the pre-configured period of time:

cause a second transmit power reduction proposal message to be transmitted on the downlink portion of the wireless control channel between the first base station and the mobile stations operating in the wireless radio system at the first transmit power level proposing a second transmit power reduction on the downlink portion of the wireless traffic channel between a second base station and the mobile stations operating in the wireless radio system, the amount of the proposed second transmit power reduction identified via the second transmit power reduction proposal message relative to the first transmit power level at which the second transmit power reduction proposal message is transmitted is less than the amount of the first proposed transmit power reduction.

12. The radio controller of claim 10, wherein the transmit power reduction proposal message specifies a window of time equal to the pre-configured period of time on one of the uplink portion of the wireless control channel between the first base station and the mobile stations operating in the wireless radio system and uplink portion of the wireless traffic channel between the second base station and the mobile stations operating in the wireless radio system for mobile stations to transmit the indication that the proposed transmit power reduction is unacceptable;

wherein the monitoring comprises monitoring for transmitted radio frequency (RF) energy above a threshold level during the specified window of time without decoding information represented by the RF energy; and wherein the absence of the indication is a detected absence of transmitted RF energy during the specified window of time.

13. The radio controller of claim 10, wherein the uplink portion of the wireless traffic channel between the second base station and the mobile stations operating in the wireless radio system is associated with a group of mobile stations assigned to the wireless traffic channel, and wherein mobile stations that would be affected by the proposed transmit power reduction are associated with the group.

14. A mobile station in a wireless radio system, the mobile station comprising:

a transceiver;

a memory storing computer readable instructions; and one or more processors that, in response to executing the computer readable instructions, causes the mobile station to perform a set of functions comprising:

receiving, via the transceiver and a downlink portion of a wireless control channel between a first base station and mobile stations operating in the wireless radio system, a transmit power reduction proposal message transmitted at a first transmit power level proposing a transmit power reduction to lower than the first transmit power level on a downlink portion of a wireless traffic channel between a second base station and the mobile stations operating in the wireless radio system on which the mobile station is receiving or expects to receive communication information, an amount of the proposed transmit power reduction identified via the transmit power reduction proposal message relative to the first transmit power level at which the transmit power reduction proposal message is transmitted;

determining, as a function of a measured received signal strength indication (RSSI) of the wireless control channel and a preconfigured or dynamically determined minimum receive signal strength, a link margin;

comparing the determined link margin to the proposed transmit power reduction, and:

responsive to determining that the proposed transmit power reduction is greater than the link margin, subsequently transmitting, via the transceiver, a signal indicative of an unacceptable nature of the amount of the proposed transmit power reduction on one of an uplink portion of the wireless control channel between the first base station and the mobile stations operating in the wireless radio system and an uplink portion of the wireless traffic channel between the second base station and the mobile stations operating in the wireless radio system; and responsive to determining that the proposed transmit power reduction is less than the link margin, subsequently refraining from transmitting, via the transceiver, the signal indicative of the unacceptable nature of the amount of the proposed transmit power reduction on the one of the uplink portion of the wireless control channel between the first base station and the mobile stations operating in the wireless radio system and the uplink portion of the wireless traffic channel between the second base station and the mobile stations operating in the wireless radio system.

15. The mobile station of claim 14, the set of functions further comprising:

detecting, via the transceiver and the downlink portion of the wireless control channel between the first base station and the mobile stations operating in the wireless radio system, a message identifying a group call of a group with which the mobile station is associated occurring or about to occur on a second wireless traffic channel between the second base station and the mobile stations operating in the wireless radio system;

switching, via the transceiver, to a downlink portion of the second wireless traffic channel between the second base station and the mobile stations operating in the wireless radio system;

responsive to detecting an unacceptable signal level on the downlink portion of second wireless traffic channel between the second base station and the mobile stations operating in the wireless radio system:

switching the transceiver back to the uplink portion of the wireless control channel between the first base station and the mobile stations operating in the wireless radio system and transmitting over the uplink portion of the wireless control channel a request to increase the transmit power of the downlink portion of the second wireless traffic channel between the second base station and the mobile stations operating in the wireless radio system.

16. The mobile station of claim 14, the set of functions further comprising:

continuing to monitor an RSSI of the downlink portion of the wireless traffic channel between the second base station and the mobile stations operating in the wireless radio system, and responsive to the RSSI falling below a predetermined threshold level, switching the transceiver back to the uplink portion of the wireless control channel between the first base station and the mobile stations operating in the wireless radio system and transmitting a request to increase the transmit power of the downlink portion of the wireless traffic channel between the second base station and the mobile stations operating in the wireless radio system.

* * * * *